Patented Jan. 28, 1941

2,229,948

UNITED STATES PATENT OFFICE 2,229,948

FERTILIZER AND FERTILIZER ADDITIVE

Lionel Weil, Goldsboro, N. C., assignor to H. Weil & Brothers, Goldsboro, N. C., a limited co-partnership, comprising Leslie Weil and Lionel Weil, general partners, and Elizabeth Rosenthal, junior limited partner No Drawing. Application August 8, 1938,
Serial No. 223,765

14 Claims. (Cl. 71—2)

This invention relates to an improved plant fertilizer and to an improved additive for plant fertilizers.

In the plant fertilizers heretofore employed an attempt has been made to supply the plants with one or more food elements, such as phosphorus, nitrogen, potash, magnesium, calcium, or the like, in a readily assimilable form. It is an object of my invention to provide an improved plant fertilizer which not only provides the plant with the conventional plant food ingredients, as set forth above, but also incorporates one or more elements which stimulate growth of the plant and the development of its root structure.

Another object is the provision of an improved fertilizer having a growth substance, such as a hormone or hormone-like substance, incorporated therein in such a manner that it will not be adversely affected by the other chemicals or food ingredients in the fertilizer and will not deteriorate unduly when allowed to stand for relatively long periods of time.

A further object is the provision of a fertilizer, as set forth above, which is of a relatively uniform character and free from lumps so that it can be applied to the plants, as by means of a fertilizer spreader, and in which the growth substance, hormone, or hormone-like substance is in a form that is readily assimilable by the plants so as to stimulate the growth thereof and the development of the root structure but which will not injure the plant.

Among other objects is the provision of an additive for a fertilizer which incorporates a growth substance, such as a hormone or hormone-like substance which may be added to commercial plant fertilizers to produce an improved fertilizer of the above character.

My invention contemplates incorporating a small quantity of a plant growth substance, i. e., a plant hormone or hormone-like substance in a ground or pulverized organic base which serves as a stabilizer so as to form an additive which is mixed with a plant fertilizer. The resulting fertilizer not only supplies the plant with food ingredients but due to the growth substance stimulates the growth of the plant and the development of its root structure.

Heretofore certain plant hormones and hormone-like substances, which are designated by the name "Plant Growth Substances", more particularly, plant growth substances of the auxin type have been identified and it has been proposed to use these substances in connection with plant cuttings to induce the formation of root structures. I have found that if growth substances of this character are properly incorporated in a plant fertilizer, they stimulate plant growth and the development of the root structure.

All substances which can be employed in carrying out my invention are auxin-like substances and can be properly described as organic compounds containing an unsaturated ring system with a side chain of at least two carbon atoms adjoining the double bond, and this side chain having a carboxyl group or a group readily convertible to a carboxyl group. Examples of such auxin-like substances are the indole, naphthalene and phenyl compounds of certain of the fatty acids and also certain of the esters and salts of this group of acid compounds. Of this group it has been found that the following more particularly are active in promoting plant growth: hetero-auxin, i. e., indoleacetic acid and certain of its homologues, such as indolebutyric and indolepropionic acids; also naphthaleneacetic, phenylacetic, phenylacrylic and phenylpropionic acids and the methyl and ethyl esters of the above acids and the potassium, sodium, calcium, barium, strontium and ammonium salts of the acids. Of this group I have obtained the most satisfactory results from the use of indolebutyric and naphthaleneacetic acids.

In preparing a fertilizer or an additive for a fertilizer in accordance with my present invention, I first mix the growth substance with a carrying agent and stabilizer formed of a ground or pulverized fibrous organic material. The expression "fibrous organic material" is used herein in its broad or generic sense to indicate organic material containing cell walls. For this purpose many different types of ground or finely divided organic material may be employed, such as peanut meal, ground peanut hulls, cotton seed meal, soy bean meal, ground tobacco stems, fish meal, blood, tankage, nitrogenous material, castor pomace and peat.

In order to obtain a uniform mixture between the ground organic material and the growth substance, I have found it desirable to first dissolve the growth substance in a suitable solvent. Thus I dissolve the growth substance in an equal mixture of alcohol and glycerin at the proportion of one gram of growth substance in approximately 250 cubic centimeters of alcohol and glycerin. In mixing the ground organic material and the solution of the growth substance the ground organic material is agitated in a mill, or the like, and the solution of growth substance is slowly introduced while the organic material is being agitated. The agitation is continued so as to obtain a substantially uniform distribution of the solution. After a uniform mixture has been obtained, the impregnated organic material is permitted to dry, forming an additive for a fertilizer which has incorporated therein a growth substance.

The additive may be immediately mixed with a commercial plant fertilizer of the usual type having one or more food ingredients therein, such as nitrogen, phosphorus, potash, calcium, magnesium, or the like, in a readily assimilable form, and the mixture may then be distributed as a complete fertilizer, or if desired, the additive may be separately packed and sold and mixed with the fertilizer just prior to use, or may be applied separately to the plants along with a fertilizer.

At the time that the additive and fertilizer are mixed together, they should be substantially dry so as to minimize any chemical reaction between the ingredients. The mixing may take place in a mill, or the like, so as to insure a uniform distribution of the additive throughout the mass of the fertilizer.

The proportions of the ingredients may vary but I have found that in each ton of fertilizer it is desirable to have between 60 and 400 milligrams of the growth substance and that the most satisfactory results are obtained when the fertilizer contains between 120 and 240 milligrams of the growth substance. A mixture of the desired type can be obtained by mixing the desired quantity of the growth substance with a given weight of the organic carrying agent. Thus to each 100 pounds of the carrying agent between thirty to sixty cubic centimeters of the solution of the growth substance prepared as set forth above, should be added in order to impregnate the carrying agent with between 120 to 240 milligrams of the growth substance. A fertilizer embodying my invention can then be formed by mixing the additive to the standard commercial fertilizer in the proportion of 100 pounds of additive to each 1900 pounds of commercial fertilizer.

So as to more fully describe the invention, I am herein setting forth one specific example of a method of forming a fertilizer and a fertilizer additive embodying my invention. Indolebutyric acid is first dissolved in a solvent formed of equal portions of alcohol and glycerin in the proportion of one gram of indolebutyric acid to each 250 cubic centimeters of solvent. A suitably ground or finely divided carrying agent, as for instance, ground peanut hulls, is then placed in a mill and agitated and the solution of indolebutyric acid is then slowly introduced into the peanut hulls while they are being agitated. To produce the preferred form of my fertilizer between thirty and sixty cubic centimeters of the indolebutyric acid solution are introduced for each 100 pounds of ground peanut hulls, and in this way between 120 and 240 milligrams of the indolebutyric acid are added to each 100 pounds of peanut hulls. The agitation is continued until a complete and uniform mixture has been obtained and the mixture is then permitted to dry. It will be appreciated that this mixture forms an additive for a fertilizer and may be sold or distributed in this form, if preferred, or it may be immediately mixed with a commercial fertilizer.

The additive is suitable for use with any of the standard commercial plant fertilizers which contain food ingredients, such as nitrogen, phosphorus, potash, calcium, magnesium, or the like. The fertilizer and additive are mixed together in the proportion of 100 pounds of additive for each 1900 pounds of commercial fertilizer. The additive and fertilizer should be thoroughly mixed together so as to produce a uniform mixture in which the additive is uniformly distributed throughout the mass. The fertilizer thus formed will have between 120 and 240 milligrams of indolebutyric acid in each ton of complete fertilizer.

As stated above, the quantities may be varied so that each ton has between 60 and 400 milligrams of indolebutyric acid. I have found, however, that if the quantity of indolebutyric acid is decreased or increased substantially beyond these limits, the results are not as satisfactory. It should be understood that instead of using 100 pounds of additive as the unit to be added to each 1900 pounds of fertilizer, either a smaller or larger amount may be used and in that case, the amount of indolebutyric acid, or other growth substance, embodied in the additive will be proportionately varied. Thus where 200 pounds of additive are added to 1800 pounds of commercial fertilizer between fifteen and thirty cubic centimeters of the solution of indolebutyric acid will be added to each 100 pounds of organic carrying agent to produce a fertilizer having the preferred amount of indolebutyric acid embodied therein, i. e., 120 to 240 milligrams to each ton of fertilizer.

I have set forth above one specific example of forming a fertilizer and a fertilizer additive embodying my invention. It should be understood that instead of employing indolebutyric acid naphthaleneacetic acid or any of the other growth substances may be employed and that other ground organic carrying agents may be substituted for the ground peanut hulls.

The fertilizer embodying my invention may be used in the same manner as standard commercial plant fertilizers and being free of lumps, or the like, may be applied to the plants in any desired manner, as by means of a fertilizer spreader. In addition to supplying the conventional food ingredients to the plants, my improved fertilizer stimulates the growth of the plants and the development of the root structure. Furthermore, the growth substance, as embodied in the fertilizer, does not injure or damage the plant and even when the fertilizer is stored for a relatively long period of time, it does not deteriorate to any substantial degree and is able to withstand the action of sunlight.

I claim:

1. In a plant fertilizer, plant food ingredients in an assimilable form, and an additive mixed therewith and comprising a finely divided fibrous organic material having intimately mixed therewith a plant growth substance selected from the group consisting of indolebutyric and naphthaleneacetic acids and their homologues, and the methyl and ethyl esters and the potassium, sodium, calcium, barium, strontium and ammonium salts thereof, the plant growth substance being in the proportion of 60 to 400 milligrams to the ton of fertilizer.

2. In a plant fertilizer, plant food ingredients in an assimilable form, and an additive mixed therewith and comprising a finely divided fibrous organic material having intimately mixed therewith a plant growth substance selected from the group consisting of indolebutyric and naphthaleneacetic acids and their homologues, and the methyl and ethyl esters and the potassium, sodium, calcium, barium, strontium and ammonium salts thereof, the plant growth substance being in the proportion of 120 to 240 milligrams to the ton of fertilizer.

3. In a plant fertilizer, plant food ingredients in an assimilable form, and an additive mixed therewith comprising a finely divided fibrous organic material having indolebutyric acid incorporated therein, the indolebutyric acid being in the proportion of 60 to 400 milligrams to the ton of fertilizer.

4. In a plant fertilizer, plant food ingredients in an assimilable form, and an additive mixed therewith comprising a finely divided fibrous organic material having indolebutyric acid incorporated therein, the indolebutyric acid being in the proportion of 120 to 240 milligrams to the ton of fertilizer.

5. In a plant fertilizer, plant food ingredients in an assimilable form, and an additive mixed therewith comprising a finely divided fibrous organic material having naphthaleneacetic acid incorporated therein, the naphthaleneacetic acid being in the proportion of 60 to 400 milligrams to the ton of fertilizer.

6. In a plant fertilizer, plant food ingredients in an assimilable form, and an additive mixed therewith comprising a finely divided fibrous organic material having naphthaleneacetic acid incorporated therein, the naphthaleneacetic acid being in the proportion of 120 to 240 milligrams to the ton of fertilizer.

7. An additive for a fertilizer comprising a finely divided fibrous organic material having incorporated therein a plant growth substance selected from the group consisting of indolebutyric and naphthaleneacetic acids and their homologues, and the methyl and ethyl esters and the potassium, sodium, calcium, barium, strontium and ammonium salts thereof said plant growth substance being in the proportion of more than 60 milligrams to the ton of additive.

8. An additive for a fertilizer comprising a finely divided fibrous organic material having incorporated therein a plant growth substance selected from the group consisting of indolebutyric and naphthaleneacetic acids and their homologues, and the methyl and ethyl esters and the potassium, sodium, calcium, barium, strontium and ammonium salts thereof, said plant growth substance being in the proportion of more than 120 milligrams to the ton of additive.

9. A plant fertilizer product comprising a finely divided fibrous organic material having incorporated therein a plant growth substance of the auxin type selected from the group consisting of an organic compound containing an unsaturated ring system with a side chain of at least two carbon atoms adjoining the double bond and this side chain having a carboxyl group and an organic compound containing an unsaturated ring system with a side chain of at least two carbon atoms adjoining the double bond, and this side chain having a group readily convertible to a carboxyl group, said plant growth substance being in the proportion of more than 60 milligrams to a ton of fertilizer product.

10. A plant fertilizer product comprising a finely divided fibrous organic material having incorporated therein a plant growth substance of the auxin type selected from the group consisting of an organic compound containing an unsaturated ring system with a side chain of at least two carbon atoms adjoining the double bond and this side chain having a carboxyl group and an organic compound containing an unsaturated ring system with a side chain of at least two carbon atoms adjoining the double bond, and this side chain having a group readily convertible to a carboxyl group, said plant growth substance being in the proportion of more than 120 milligrams to a ton of fertilizer product.

11. In a plant fertilizer, plant food ingredients in an assimilable form, and an additive mixed therewith comprising a finely divided fibrous organic material having intimately mixed therewith a plant growth substance of the auxin type selected from the group consisting of an organic compound containing an unsaturated ring system with a side chain of at least two carbon atoms adjoining the double bond and this side chain having a carboxyl group and an organic compound containing an unsaturated ring system with a side chain of at least two carbon atoms adjoining the double bond, and this side chain having a group readily convertible to a carboxyl group, the plant growth substance being in the proportion of more than 60 milligrams to a ton of fertilizer.

12. In a plant fertilizer, plant food ingredients in an assimilable form, and an additive mixed therewith comprising a finely divided fibrous organic material having intimately mixed therewith a plant growth substance of the auxin type selected from the group consisting of an organic compound containing an unsaturated ring system with a side chain of at least two carbon atoms adjoining the double bond and this side chain having a carboxyl group and an organic compound containing an unsaturated ring system with a side chain of at least two carbon atoms adjoining the double bond, and this side chain having a group readily convertible to a carboxyl group, the plant growth substance being in the proportion of more than 120 milligrams to a ton of fertilizer.

13. In a plant fertilizer, plant food ingredients in an assimilable form, and an additive mixed therewith comprising a finely divided fibrous organic material having intimately mixed therewith a plant growth substance of the auxin type selected from the group consisting of an organic compound containing an unsaturated ring system with a side chain of at least two carbon atoms adjoining the double bond and this side chain having a carboxyl group and an organic compound containing an unsaturated ring system with a side chain of at least two carbon atoms adjoining the double bond, and this side chain having a group readily convertible to a carboxyl group, the plant growth substance being in the proportion of between 60 and 400 milligrams to a ton of fertilizer.

14. In a plant fertilizer, plant food ingredients in an assimilable form, and an additive mixed therewith comprising a finely divided fibrous organic material having intimately mixed therewith a plant growth substance of the auxin type selected from the group consisting of an organic compound containing an unsaturated ring system with a side chain of at least two carbon atoms adjoining the double bond and this side chain having a carboxyl group and an organic compound containing an unsaturated ring system with a side chain of at least two carbon atoms adjoining the double bond, and this side chain having a group readily convertible to a carboxyl group, the plant growth substance being in the proportion of between 120 and 240 milligrams to a ton of fertilizer.

LIONEL WEIL.